(No Model.)
C. A. McCULLOCH & M. F. CORNEABY.
CHAIN BRUSH FOR BICYCLES.
No. 574,621. Patented Jan. 5, 1897.
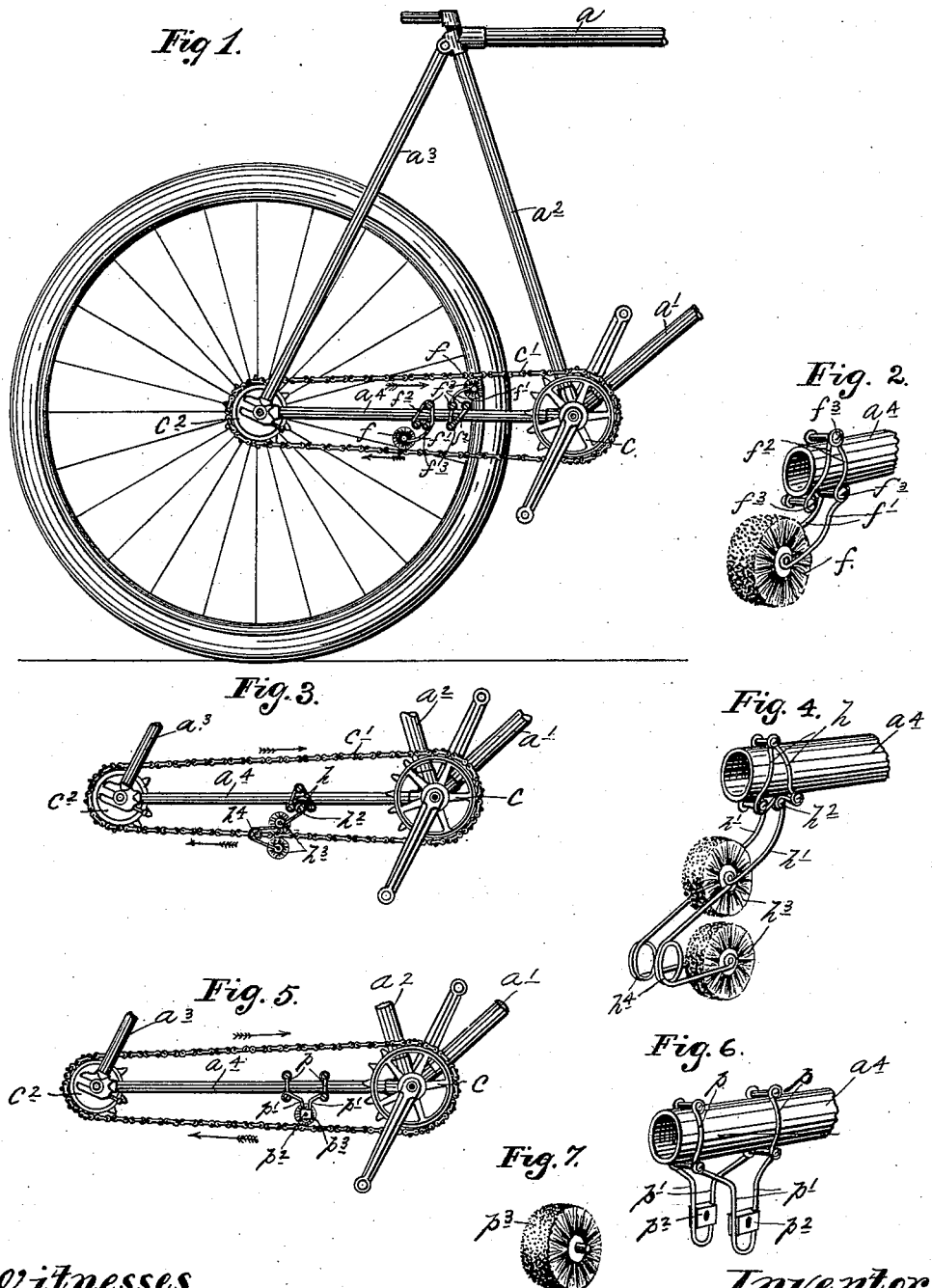
Witnesses.
C. F. Kilju
R. D. Merchant.
Inventors
Charles A. McCulloch
Maximillion F. Corneaby.
By their Attorney.
Jas. F. Williamson.

UNITED STATES PATENT OFFICE.

CHARLES A. McCULLOCH AND MAXIMILLION F. CORNEABY, OF MINNEAPOLIS, MINNESOTA.

CHAIN-BRUSH FOR BICYCLES.

SPECIFICATION forming part of Letters Patent No. 574,621, dated January 5, 1897.

Application filed November 21, 1895. Serial No. 569,663. (No model.)

*To all whom it may concern:*

Be it known that we, CHARLES A. McCULLOCH and MAXIMILLION F. CORNEABY, citizens of the United States, residing at Minneapolis, in the county of Hennepin and State of Minnesota, have invented certain new and useful Improvements in Chain-Brushes for Bicycles; and we do hereby declare the following to be a full, clear, and exact description of the invention, such as will enable others skilled in the art to which it appertains to make and use the same.

Our invention has for its object to provide an attachment for keeping clean the chain of a sprocket-and-chain drive for cycles or other machines.

The invention was especially designed for use on bicycles of the safety type, but is capable of general application to sprocket-and-chain drives wherever the function above noted is required.

To this end our invention consists of the novel devices and combinations of devices hereinafter described, and defined in the claims.

The invention is illustrated in the accompanying drawings, wherein, like letters referring to like parts throughout the several views—

Figure 1 is a side elevation showing a part of a bicycle with the invention applied thereto. Fig. 2 is a perspective view of the attachment and a part of the frame of the bicycle, detached. Fig. 3 is a side elevation of part of a bicycle with a modified form of the attachment applied thereto. Fig. 4 is a detail in perspective, showing the attachment illustrated in Fig. 3, but on a larger scale. Fig. 5 is a view similar to Fig. 3, showing still another modification; and Figs. 6 and 7 are details thereof in perspective and on a larger scale.

In respect to the bicycle it will be sufficient to distinguish the frame members $a\, a'\, a^2\, a^3\, a^4$, the rear wheel $b$, and the sprocket-and-chain drive $c\, c'\, c^2$ from the crank-shaft to the rear wheel.

To that member of the bottom stays $a^4$ of the frame which is on the chain side of the wheel we secure one or more automatically-adjustable brushes $f$, adapted to hug the chain, regardless of the dip or slack therein.

As shown in Figs. 1 and 2, the brush $f$ is journaled in the outer or free ends of a spring-holder $f'$, which is carried by a clamp $f^2$, adapted to be secured to the bottom stay $a^4$. The clamp $f^2$ and the holder $f'$ can be conveniently and cheaply made from a pair of wires, properly bent upon themselves, to form the clamp sides or jaws and the holder-arms, and to afford seats for the brush-journals and the clamping nutted screws $f^3$, as clearly shown in the drawings. By the removal or application of the apex member of the clamping-screws $f^3$ the device can be readily applied to or removed from its working position.

When properly applied, as shown in Fig. 1, for example, the spring arms of the holder $f'$ will force the brush $f$ against the face of the chain $c'$ with a spring or yielding action, thereby always keeping the brush in contact with the chain. Hence the chain will be kept clear from dust and dirt by the action of the rotary brush thereon.

In Fig. 1 of the drawings we have shown two of the devices applied to the chain, one working downward against the underrunning section of the chain and the other working upward against the overrunning section of the chain; but in practice the single device would be sufficient for the functions desired. We have shown the two devices in Fig. 1 simply for illustrating the fact that the device can be readily applied either to the underrunning or to the overrunning section of the chain, as may be desired.

In the modification shown in Figs. 3 and 4 the clamp sides or jaws $h$ and the brush-holder arms $h'$ are shown as made up from separate wires. The holder-arms $h'$ are connected to the clamp-jaws $h$ by nutted screws or bolts $h^2$, by means of which the brush-holder proper may either be rendered rigid with the clamp or be pivotally supported therefrom at will, and the holder-arms $h'$ are extended and properly formed to afford seats for a pair of brushes $h^3$, suitably spaced apart to embrace the chain, as shown in Fig. 3, and held under yielding tension in respect to each other by the parts of the spring-holder, which are preferably provided with coil-sections $h^4$ between the brush-seats, as best shown in Fig. 4. With this form of device both sides of the chain will be swept by the coöperating brushes $h^3$, which will be held in contact therewith under yielding or spring tension. If the holder is rigid with the clamp, then the form shown in Figs. 3 and 4 will adjust itself in the same way as the form shown in Figs. 1 and 2 to make the brushes hug the chain. If the holder be given freedom for pivotal movement in respect to the clamp, which may be readily done by loosening the nutted bolts $h^2$, then the gripping or hugging action of the coöperating pair of brushes $h^3$ will be increased by the tendency thereof to follow the chain until the spring-arms of the holder clamp the chain; but even if the holder be thus pivoted the clamping action from the arms of the holder for the said brushes $h^3$ cannot become excessive, so as to interfere with the free movement of the chain between the brushes, because the arm-sections holding the outermost brush are free to spread or separate from the arm-section holding the innermost brush. With the form shown in Figs. 3 and 4 the cleaning action will be heightened when the holder is free for pivotal movement; but the cleaning action will probably be sufficient, even when it is rigid with the clamp, while the wear and tear on the brushes will probably be less.

In the form shown in Figs. 5, 6, and 7 the clamps $p$ and the holder-arms $p'$ are formed integral with each other from single wires, with the holder-arms so shaped as to form guides for journal-boxes $p^2$. The brush $p^3$ is mounted with its journals in the sliding boxes $p^2$, and the device is applied to the bottom stay $a^4$ of the frame so as to depend therefrom, with the brush working on the underrunning section of the chain, as shown in Fig. 5. With this form of device the brush $p^3$ is free for vertical movement under the action of gravity, so that it will constantly hug the chain. The hugging effect may of course be varied to suit the conditions by simply varying the weight of the brush or the brush-boxes.

From the foregoing statements it must be obvious that the three different forms of the invention disclosed perform the common functions of applying a brush or brushes to the chain with an automatic adjustment, which keeps the brush constantly in contact with the chain.

The automatic adjustment is essential to a successful cleaning-brush, for the reason that otherwise the brush will only occasionally operate on the chain. With the automatic adjustment the brush operates constantly on the chain.

The desirability of keeping the chain clean is of course well understood. If the chain is permitted to clog with dirt, sand, and dust, the power required for the driving action is increased, the chain or the sprockets, or both, will frequently be broken, and the chain-links and sprocket-teeth will be rapidly cut and worn out. Our invention, therefore, lessens the work to the rider, decreases the repair account, and prolongs the life of the drive.

It should also be noted as an incidental function that the brush-holder will operate to some extent as a tightener for the chain. This action will not be sufficient to have any very material effect on the overrunning or pulling section of the chain, but may be sufficient to avoid rattle from the slack section of the chain. It is not desirable to have the holder sufficiently strong in its spring action to operate as a tightener for the pulling section of the chain, for the reason that the wear and tear would then be too great on the brushes. The invention is designed primarily for cleaning purposes only.

It will be understood that the minor features of the construction might be changed without departing from the spirit of our invention.

What we claim, and desire to secure by Letters Patent of the United States, is as follows:

1. An attachment for sprocket-and-chain drives for cycles and other uses, consisting of the spring-holder, the side pieces of which are formed by spring-wires bent upon themselves to form the clamp sides or jaws with bolt-eyes, and holder-arms for the brush or brushes, the bolts passing through the bolt-eyes of said jaws, and one or more brushes loosely mounted in said holder-arms, substantially as described.

2. An attachment for sprocket-and-chain drives for cycles and other uses, consisting of the spring-holder the side pieces of which are formed by spring-wires bent upon themselves to form the clamp sides or jaws with bolt-eyes, and the holder-arms with U-shaped free ends, the bolts passing through the bolt-eyes of said jaws, and the pair of brushes mounted in said holder-arms, substantially as described.

In testimony whereof we affix our signatures in presence of two witnesses.

CHARLES A. McCULLOCH.
MAXIMILLION F. CORNEABY.

Witnesses:
JAS. F. WILLIAMSON,
WM. R. MORRIS.